United States Patent
Sachs et al.

(10) Patent No.: US 8,811,201 B2
(45) Date of Patent: Aug. 19, 2014

(54) ACCESS NETWORK SELECTION IN A MULTI-ACCESS NETWORK ENVIRONMENT

(75) Inventors: Joachim Sachs, Aachen (DE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 557 days.

(21) Appl. No.: 12/937,780

(22) PCT Filed: Jun. 13, 2008

(86) PCT No.: PCT/EP2008/004792
§ 371 (c)(1),
(2), (4) Date: Jan. 5, 2011

(87) PCT Pub. No.: WO2009/127238
PCT Pub. Date: Oct. 22, 2009

(65) Prior Publication Data
US 2011/0110300 A1 May 12, 2011

Related U.S. Application Data

(60) Provisional application No. 61/045,992, filed on Apr. 18, 2008.

(51) Int. Cl.
*H04W 88/06* (2009.01)
*H04W 84/08* (2009.01)

(52) U.S. Cl.
USPC .......................................... 370/252; 370/328

(58) Field of Classification Search
CPC ...................... H04L 29/06027; H04L 12/6418; H04L 49/25; H04L 49/30; H04L 29/06326; H04M 7/006; H04W 88/06; H04W 84/08
USPC .......................................... 370/328, 352–356
See application file for complete search history.

(56) References Cited

U.S. PATENT DOCUMENTS

| 6,389,005 B1* | 5/2002 | Cruickshank ................. 370/352 |
| 2005/0083899 A1* | 4/2005 | Babbar et al. ................. 370/342 |
| 2006/0282554 A1 | 12/2006 | Jiang et al. |

(Continued)

FOREIGN PATENT DOCUMENTS

WO 2005/117463 A2 12/2005

OTHER PUBLICATIONS

3rd Generation Partnership Project. "Minimization of UE Initiated Transactions to ANDSF." 3GPP TSG-SA WG2 Meeting #64, S2-082711, Jeju, South Korea, Apr. 7-11, 2008.

(Continued)

*Primary Examiner* — Ronald Abelson
(74) *Attorney, Agent, or Firm* — Coats & Bennett, PLLC

(57) ABSTRACT

Novel techniques of access network selection in multi-access network environment are provided, which allow for avoiding access selection loops for independent access selection processes. The multi-access network environment provides a first access selection function, e.g. a 3GPP access selection function, and a second access selection function, e.g. an ANDSF based access selection function. At least a portion of the first access selection function (565) may be implemented by a network component (560). At least a portion of the second access selection function (110) may be implemented by a user equipment (100), e.g. a mobile terminal. According to the proposed concepts, a selection priority information of the first access selection function (565) is made available to the second access selection function (110).

42 Claims, 9 Drawing Sheets

(56) References Cited

U.S. PATENT DOCUMENTS

2007/0223516 A1     9/2007   Dunn et al.
2007/0297378 A1    12/2007   Poyhonen et al.
2008/0176552 A1*    7/2008   Hamano et al. ............ 455/422.1

OTHER PUBLICATIONS

3rd Generation Partnership Project, "Technical Specification Group Radio Access Network; Evolved Universal Terrestrial Radio Access (E-UTRA); User Equipment (UE) procedures in idle mode (Release 8)", 3GPP TS 36.304 V8.1.0, Mar. 2008, pp. 1-29.

3rd Generation Partnership Project, "Technical Specification Group Radio Access Network; Evolved Universal Terrestrial Radio Access (E-UTRA); Radio Resource Control (RRC); Protocol specification (Release 8)", 3GPP TS 36.331 V8.1.0, Mar. 2008, pp. 1-122.

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.4.0, Mar. 2008, pp. 1-126.

3rd Generation Partnership Project, "Technical Specification Group Core Network and Terminals; Non-Access-Stratum (NAS) functions related to Mobile Station (MS) in idle mode (Release 8)", 3GPP TS 23.122 V8.1.0, Mar. 2008, pp. 1-35.

3rd Generation Partnership Project, "Technical Specification Group Services and System Aspects; Architecture enhancements for non-3GPP accesses (Release 8)", 3GPP TS 23.402 V8.1.1, Mar. 2008, pp. 1-163.

* cited by examiner

ACCESS NETWORK SELECTION IN A MULTI-ACCESS NETWORK ENVIRONMENT

FIELD OF THE INVENTION

The present invention relates to access network selection in a multi-access network environment with a plurality of access networks, the plurality of access networks comprising a first subgroup of access networks, e.g. 3GPP access networks (3GPP: third generation partnership project), and a second subgroup of access networks, e.g. Non-3GPP access networks. In particular, the present invention relates to techniques for preventing access selection loops which may occur for independent access selection processes.

BACKGROUND OF THE INVENTION

Access technologies of various kinds, especially wireless, are becoming increasingly ubiquitous, e.g. in the shape of GSM (Global System for Mobile communication)/GPRS (General Packet Radio Service)/EDGE (Enhanced Data rates for GSM Evolution), WCDMA (Wideband Code Division Multiple Access)/HSPA (High Speed Packet Access), CDMA2000 (a cellular network standard based on Code Division Multiple Access), WLAN (Wireless Local Area Network), WiMAX (Worldwide Interoperability for Microwave Access) and soon LTE (Long Term Evolution). The mobile terminals or other types of user equipment (UE) match this multitude of access technologies by including ever more access interfaces to allow greater freedom and flexibility in the selection of access to use for each communication session.

To leverage the benefits of this growing flexibility it becomes important to have mechanisms in place for efficient control of the access selection, to ensure that a mobile node always uses its available access interfaces and access networks as efficiently as possible for the currently ongoing communication sessions. Circumstances to be taken into account include, e.g., the currently used applications, access network technologies and their properties, access network operators (and their relations to the user's home operator and/or the user), current network conditions (e.g. load), location, subscription restrictions, time of day, etc. Similarly, it is desirable to support a mobile node in discovering available accesses without requiring the mobile node to continuously scan for all accesses and thus using battery resources.

In SAE (System Architecture Evolution)/LTE, also known as EPS (Evolved Packet System), i.e. the future evolved 3GPP system, multi-access is a key element. Control of access selection (and access discovery) is recognized as an important aspect and has been assigned a dedicated work item in the 3GPP standardization process.

The mechanisms considered are based on policies and/or rules. The functionality provided by a policy/rule is instructions or guidance of which access to select or how to discover accesses given the specific circumstances (device context). A policy/rule typically defines contextual conditions when it applies (e.g. for a certain application, in a certain geographical region, a certain time of day and/or day of the week, the PLMN (Public Land Mobile Network) the UE is currently registered at, e.g. a visited PLMN during roaming, etc.) and access preferences. The access preferences may e.g. be a prioritized list of accesses, an indication of a specific only access, a list of prohibited accesses, or some other way of expressing how preferable certain accesses are.

There are three basic cases of access selection:

Selection between multiple 3GPP accesses, e.g. LTE, HSPA, WCDMA, GERAN (GSM EDGE Radio Access Network), GSM. This access selection case may also comprise the 3GPP2 ($3^{rd}$ Generation Partnership Project 2) access CDMA2000, but for simplicity it is referred to as "intra-3GPP access selection" or simply "3GPP access selection".

Selection between 3GPP and non-3GPP access(es) (where non-3GPP accesses include e.g. WiMAX and WLAN). This access selection case is referred to as "extra-3GPP access selection".

Selection between multiple non-3GPP accesses. This access selection case is referred to as "non-3GPP access selection".

Extra-3GPP access selection and non-3GPP access selection are also collectively referred to as "ANDSF based access selection", because, as will be explained later, they are controlled by the functionality provided by the Access Network Discovery and Selection Function (ANDSF). Accordingly, in the following extra-3GPP access selection and non-3GPP access selection are for reasons of simplicity also collectively referred to as "ANDSF based access selection".

Policies and/or rules may be processed in the network, e.g. in the PCRF (Policy and Charging Rules Function) or, in the context of access selection, for example in the newly introduced functional entity ANDSF, which is responsible for extra-3GPP access selection as well as non-3GPP access selection, i.e. access selection between 3GPP accesses and non-3GPP accesses and between different non-3GPP accesses. The ANDSF can be distributed between the mobile node or UE and the network. In the network the ANDSF can be located both in the home network and in the visited network. The ANDSF functionality in the UE is referred to as ueANDSF, the ANDSF functionality in the home network is referred to as hANDSF, and the ANDSF functionality in the visited network is referred to as vANDSF. The network ANDSF can be located in an entity inside (i.e. as an integral part of) or can be associated with the PCRF. It is also possible that there will be ANDSF related functionality in non-3GPP access networks, e.g. for provision of access properties as input data to the access selection process. Such possible ANDSF related functionality in non-3GPP access networks is herein tentatively labeled n3aANDSF. Further information on the introduction of the ANDSF in the 3GPP SAE architecture, as well as the related information flows, can, e.g. be found in "3GPP TS 23.402 v8.1.1, '3rd Generation Partnership Project; Technical Specification Group Services and System Aspects; Architecture enhancements for non-3GPP accesses (Release 8)', March 2008".

For 3GPP access selection, i.e. selection between different 3GPP accesses that interwork on radio access network (RAN) level (such as LTE, WCDMA/HSPA and GERAN, and possibly the 3GPP2 access CDMA2000), the access selection functionality is separate from the ANDSF. This access selection function is network based and is typically located within the RANs, e.g. E-UTRAN (Evolved Universal Terrestrial Radio Access Network), GERAN, UTRAN (Universal Terrestrial Radio Access Network), CDMA2000-RAN, and possibly partly also in the MME (Mobility Management Entity) and/or SGSN (Serving GPRS Support Node). Potentially, processing of access selection related policies and rules may take place also in this access selection function.

The ways the 3GPP access selection functionality controls the access selection of the UEs differ between connected-mode and idle-mode UEs. Here, "connected-mode UEs" refers to UEs in connected mode, which have a signaling connection established to a RAN.

Access selection for connected-mode UEs is manifested as handovers between different accesses. This is, e.g., explained in "3GPP TS 36.300 v8.4.0, '3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)', March 2008" and in "3GPP TS 36.331 v8.1.0, '3rd Generation Partnership Project; Technical Specification Group Radio Access Network; Evolved Universal Terrestrial Radio Access (E-UTRA) Radio Resource Control (RRC); Protocol specification (Release 8)', March 2008". The handovers are network controlled, but aided by measurement reports (e.g. received signal power from neighbor cells) from the UEs. The network sets the trigger criteria for the UEs' measurement reports (through broadcasting of thresholds and/or by sending UE specific criteria to individual UEs) and also determines when and to which cell (and access network) a handover should be performed.

For idle-mode UEs access selection is realized as cell reselection, i.e. repeatedly evaluating the best cell to camp on, as well as access technology (or Radio Access Technology, RAT) selection. This is, e.g., explained in "3GPP TS 36.304 v.8.1.0, '3rd Generation Partnership Project; Technical Specification Group Radio Access Network; Evolved Universal Terrestrial Radio Access (E-UTRA); User Equipment (UE) procedures in idle mode (Release 8)', March 2008". The network broadcasts (in the system information) the signal strength threshold levels determining when the UEs should evaluate neighbor cells for cell reselection. The network can also provide RAT and carrier frequency priorities in the broadcast system information and optionally in a UE specific signaling message when the RRC (Radio Resource Control) connection to the RAN is released.

For initial selection of PLMN and preferred access technology, e.g. when the UE is powered on, the UE is typically guided by information stored on the SIM card (SIM: Subscriber Identity Module) or USIM card (USIM: Universal Subscriber Identity Module). This is, e.g., explained in "3GPP TS 36.304 v.8.1.0, '3rd Generation Partnership Project; Technical Specification Group Radio Access Network; Evolved Universal Terrestrial Radio Access (E-UTRA); User Equipment (UE) procedures in idle mode (Release 8)', March 2008" and in "3GPP TS 23.122 v8.1.1, '3rd Generation Partnership Project; Technical Specification Group Core Network and Terminals; Non-Access-Stratum (NAS) functions related to Mobile Station (MS) in idle mode (Release 8)', March 2008"). This information originate from the operator (i.e. the operator with which the SIM/USIM card is associated), but may be complemented with information from the user. The user can also choose to make the initial selection purely manual.

An advantage of keeping the 3GPP access selection functionality distinct from the ANDSF based access selection functionality is that both selection functionalities can be optimized in this way for different time scales and/or interfaces. As an example, ANDSF communication may take place on a long time scale, possibly minutes, hours or even months. Thus updates of the rules can be comparatively seldom and may be transported easily by the IP protocol. In contrast, 3GPP access selection may be optimized for a synchronization of communications based on timeslots of the access systems, typically on the order of several milliseconds. In this way, a UE can for example perform measurements on one access systems during short intervals in a transmission over a different 3GPP access system. This allows the preparation of inter-system handovers even for a UE with only a single transceiver but requires elaborate interfaces.

Access selection and access discovery are not restricted to mobile or wireless nodes/terminals. They are equally applicable for so called "user networks". The term user network (UN) refers to one or more inter-connected user devices that can access a network via one or more access technologies. Examples of a single-device user network are a cellular phone or a laptop, while an example of a multi-device user network is a Personal Area Network (PAN). Although only the term UE will henceforth be used in this document, it should be interpreted as either a single device, i.e. a mobile terminal, or a multi-device user network.

The problem with the existing solution is that because the two access selection mechanisms are separate, access selection loops may occur in some situations. To illustrate this problem consider the following example.

In a certain situation (defined by context parameters, e.g. active applications, time of day, etc.) the 3GPP access selection functionality has the following prioritized access preference list (most preferred first):
1. WCDMA
2. LTE
3. GERAN Reasons for this priority order may include policies for load balancing or steering of certain applications to certain access networks (e.g. running voice calls over circuit switched WCDMA bearers).

In the same situation the ANDSF based access selection functionality has the following prioritized access preference list (most preferred first):
1. Corporate WLAN
2. 3GPP domain if 3GPP access=LTE is available
3. WiMAX
4. 3GPP domain if 3GPP access=WCDMA or GERAN is available Initially we assume that the concerned UE is connected to the 3GPP domain. Within the 3GPP domain the 3GPP access selection mechanism directs the UE to WCDMA (even if LTE is available in the current location), because this is the highest priority 3GPP access (in the given situation).

The UE detects an available WiMAX access and the ANDSF based access selection mechanism determines to leave the 3GPP domain and hands over the UE to the WiMAX access, because it has a higher priority than a 3GPP domain represented by WCDMA.

While the UE is connected to WiMAX it scans for higher priority access networks. It detects LTE but no corporate WLAN and thus, in accordance with its prioritized access preference list, the ANDSF based access selection functionality hands over the UE to LTE in the 3GPP domain.

Once connected to the 3GPP domain the above described mechanisms used by the 3GPP access selection functionality kicks in and directs the UE to WCDMA, thereby forming a potentially endless access selection loop.

Accordingly, there exists a need to provide improved techniques for access network selection in a multi-access network environment which provides multiple independent access selection processes.

SUMMARY OF THE INVENTION

According to an embodiment of the invention, a method of access network selection in a multi-access network environment with a plurality of access networks is provided. The plurality of access networks comprise a first subgroup of access networks and a second subgroup of access networks which are not part of the first subgroup of access networks. For example, the first subgroup of access networks may comprise 3GPP access networks, and the second subgroup of access networks may comprise non-3GPP access networks, e.g. WLAN access networks or WiMAX access networks. In the multi-access network environment, at least a first access selection function and a second access selection function are provided. The first access selection function is adapted to select an access network from the first subgroup on the basis of a first set of selection rules, and the second access selection function is adapted to select at least one access network from both the first subgroup and the second subgroup on the basis of a second set of selection rules. The second selection function may select only one access network from the first subgroup or may select a group of access networks from the first subgroup, e.g. all access networks of the first subgroup. The first access selection function may be a 3GPP access selection function, e.g. as described in the above-mentioned 3GPP technical specifications. The second access selection function may be an ANDSF based access selection function as defined above.

According to the embodiment, the method of access network selection comprises the step of making a selection priority information of the first access selection function available to the second access selection function. For example, this may involve transmitting a result of the first access selection function from an entity implementing at least a part of the first access selection function to an entity implementing at least a part of the second access selection function. The first access selection function may be distributed between functional entities on the network side, e.g. network components, and a user equipment. Similarly, the second access selection function may be distributed between functional entities on the network side, e.g. network components, and a user equipment. According to an embodiment, at least the final processing of the second access selection function is implemented within a user equipment. The selection priority information may be stored in a memory, e.g. an access preference cache of the user equipment.

By making the selection priority information of the first access selection function available to the second access selection function, the second access selection function becomes aware of the preferences of the first access selection function, which allows for avoiding undesired access selection loops.

According to an embodiment, in the second access selection function an access network from the first subgroup is only selected, i.e. considered for selection, if no other access network of the first subgroup having a higher priority according to the first set of selection rules is available. In this way, the selection priority information of the first access selection function is taken into account in the second access selection function, and the second access selection function will select that access network of the first subgroup which would also be selected according to the first access selection function.

The selection priority information may specify an access network of the first subgroup which is selected according to the first access selection function, and in the second access selection function those access networks of the first subgroup which have lower priority than the selected access network of the first access selection function may be filtered out. For example, the second access selection function may use a list of access networks with associated priorities. In this case, the list can be filtered according to the first selection rules so that only the access network from the first subgroup with the highest priority remains in the list apart from the access networks of the second subgroup.

According to an embodiment, the method may also involve maintaining an availability information indicating which access networks of the first subgroup are available for a particular user equipment. Further, the selection priority information may be generated on the basis of an access network of the first subgroup which is used by a particular user equipment when the user equipment changes to an access network of the second subgroup. The selection priority information may also be generated on the basis of those access networks of the first subgroup which are available for a particular user equipment when the user equipment changes to an access network of the second subgroup. In addition, it is also possible to generate the selection priority information on the basis of contextual parameters which are valid for a particular user equipment when the user equipment changes to an access network of the second subgroup. The contextual parameters may be selected from the group comprising: an information on active applications of the user equipment, an information on the location of the user equipment, an information on the velocity of the user equipment, an information on the time of day, an information on the day of the week, and an information on a PLMN the user equipment is currently registered at. That is to say, the selection priority information may not only be generated by directly transmitting a result of the first access selection function to the second access selection function, but may also be accomplished by monitoring parameters, e.g. access selection results, related to the first access selection function, which allow for making a conclusion on a preferred access network of the first access selection function.

According to a further embodiment, a network component for use in the above-described type of multi-access network environment is provided. In accordance with the above-described concepts, the network component is adapted to make a selection priority information of the first access selection function available to the second access selection function. The network component may be a functional entity which is typically used to implement the ANDSF functionality in the home network or in the visited network, e.g. the hPCRF (home PCRF, the PCRF in the home network) or the vPCRF (visited PCRF, the PCRF in the visited network). These functional entities are explained in the 3GPP technical specifications. Accordingly, the network component may be configured to implement at least a portion of the second access selection function. Preferably, the network component is configured to operate according to the above-described methods.

According to a further embodiment of the invention, a user equipment for use in the above-described multi-access network environment is provided. The user equipment may be a mobile terminal or mobile node, e.g. a cellular phone. However, it may also be a user network comprising one or more inter-connected user devices that can access a network via one or more access technologies. The user network may be of the single-device type, e.g. a cellular phone or a laptop, or of a multi-device type, e.g. a PAN (Personal Area Network).

According to the embodiment, the user equipment is adapted to make a selection priority information of the first access selection function available to the second access selection function. At least a portion of the second access selection function may be implemented by the user equipment, e.g. by the ueANDSF.

The user equipment may be provided with a cache memory for storing the selection priority information of the first access selection function. Further, the user equipment may be provided with functional entities for monitoring parameters related to the first access selection function. The selection priority information may then be generated on the basis of the monitored parameters. The user equipment may also directly receive the selection priority information from a functional entity implementing at least a portion of the first access selection function, e.g. from a network component.

The user equipment is preferably configured to operate according to the above-described methods.

According to a further embodiment of the invention, a network system for use in the above-described multi-access environment is provided. The network system comprises at least one network component which implements at least a portion of the first access selection function, and a user equipment and/or a further network component which implements at least a portion of the second access selection function. The network system is adapted to make a selection priority information of the first access selection function available to the second access selection function, e.g. by transmitting corresponding data from the at least one network component to the user equipment and/or to the further network component. The network system is preferably configured to operate according to the above-described methods.

The concepts of the present invention may be implemented by software running on a computer system. In particular, the user equipment may be implemented as a computer system comprising a computer processor and a memory storing a program code, and the program code may be configured in such a way that the user equipment operates according to the above-described methods and concepts. Accordingly, an embodiment of the present invention provides a computer program product comprising a program code for performing the above-described method when the program code is executed on a computer system.

DETAILED DESCRIPTION OF EMBODIMENTS

Figure 1A:
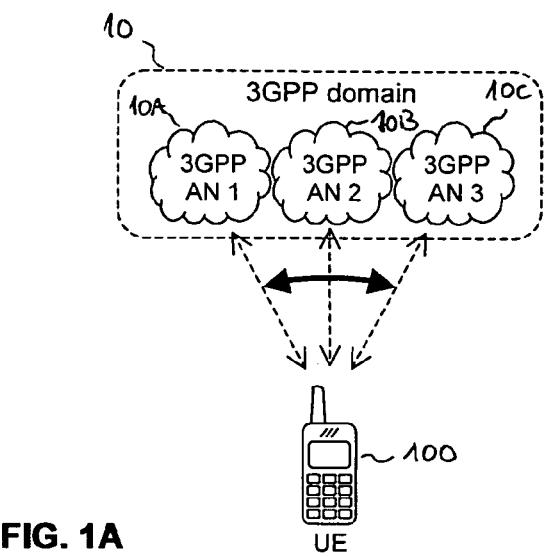
FIGS. 1A, 1B and 1C schematically illustrate different scenarios of access network selection which may occur in a multi-access network environment as used according to embodiments of the invention.

In the following, the invention will be explained in more detail by referring to exemplary embodiments which relate to a typical multi-access environment in accordance with the 3GPP above-mentioned technical specifications. The multi-access network environment comprises a plurality of access networks which may be classified in a first subgroup of 3GPP access networks and a second subgroup of non-3GPP networks. Two distinct access selection functions are provided, a first access selection function being adapted to select an access network from the first subgroup and the second access selection function being adapted to select an access network from both the first subgroup and the second subgroup. The first access selection function is referred to as 3GPP access selection functionality, and the second access selection function is referred to as ANDSF based access selection functionality. However, it is to be understood that the ANDSF based access selection functionality of this application does not need to be a function as defined in the 3GPP specifications. Rather, it can also be any access selection function for selecting between detected accesses, which considers at least one access which can also be selected by another access selection function.

As mentioned above, according to some embodiments of the invention, the first subgroup of access networks is formed of 3GPP access networks, and the second subgroup of access networks is formed of non-3GPP access networks. In this case, the first access selection function is a 3GPP access selection functionality, and the second access selection function is an ANDSF based selection functionality. According to the above concepts, the distinct separation of the two access selection mechanisms are retained, but the ANDSF based access selection functionality infers the preferences of the 3GPP access selection functionality, either by learning the (3GPP) RAT/frequency selection priorities provided to the UE, or by observing which of the available 3GPP access that is being used when the UE is associated to the 3GPP domain. In this context, "associated" means that the 3GPP access selection function can presently select a 3GPP access for the UE. In particular, the association can be a connection in connected-mode, or an association in idle-mode (i.e. camping).

Based on its observations of the 3GPP access selection functionality the ANDSF based access selection functionality can conclude that the 3GPP access selection functionality prefers a certain 3GPP access to one or more other 3GPP accesses. However, the ANDSF access selection functionality can only assume that its conclusion is valid as long as no significant change occurs in the relevant contextual parameters (which can consist e.g. of the currently actively communicating application(s), or signal strength and/or availability). Thus, when the UE is handed over from the 3GPP domain to a non-3GPP access the ANDSF based access selection functionality temporarily stores its conclusion in a 3GPP access preference cache and keeps it there until it either times out or a relevant change occurs in the relevant contextual parameters.

As long as a 3GPP access preference conclusion is stored in the 3GPP access preference cache the ANDSF based access selection functionality can use it as a guideline (in addition to its regular policies/rules) when considering handing over the UE to a 3GPP access. This means that the ANDSF based access selection functionality will not hand over the UE to a 3GPP access, which according to the information in the 3GPP access preference cache is not the most preferred of the currently available 3GPP accesses. Yet a consequence is that if the one of the available 3GPP accesses that is the most preferred according to the 3GPP access preference cache does not have a higher priority (in the view of the ANDSF based access selection functionality) than the currently used non-3GPP access, the ANDSF based access selection functionality will not hand over the UE to the 3GPP domain.

In some embodiments the ANDSF based access selection functionality has a distinct notion of which 3GPP accesses are available. This notion can be based on explicit detections of availability and timers during periods without explicit confirming indications. Explicit detections of availability can be obtained e.g. through scanning or the presence of active connections or from explicit messages, for example messages from the ANDSF in the network, informing the ueANDSF of available accesses. Optionally inter-RAT neighbor lists provided from the RAN to which the UE is currently connected can also be used as a detection of availability. Here, it should be noted that accesses included in neighbor lists are not necessarily available. Inclusion in the neighbor list only indicates that they may be available and thus worth measuring on when evaluating handover candidates.

Using the solution in the example discussed in the introductory portion would cause the UE to remain connected to WiMAX and not change to LTE, thus avoiding running into the access re-selection loop.

Accordingly, with the inventive solution access selection loops involving ANDSF based and intra-3GPP access selection are avoided. It can be implemented with low complexity and would not add a significant processing load for the UE.

While the invention has been described so far specifically in a 3GPP context it is not limited to this scenario. As explained above, the invention may also be applied generally to a communication system with a plurality of access networks and at least two access selection functions. The plurality of access networks comprises a first subgroup of access networks and further access networks which are not part of the first subgroup. A first of the access selection functions is adapted to select an access within the first subgroup according to first selection rules. A second of the access selection functions is adapted to select an access network from the further access networks and the first subgroup. The second access selection function considers in a selection an access network from the first subgroup only if it has the highest priority according to the first selection rules. Any embodiments described in connection with a 3GPP implementation may also be amended to this general concept of the invention.

Figure 1B:
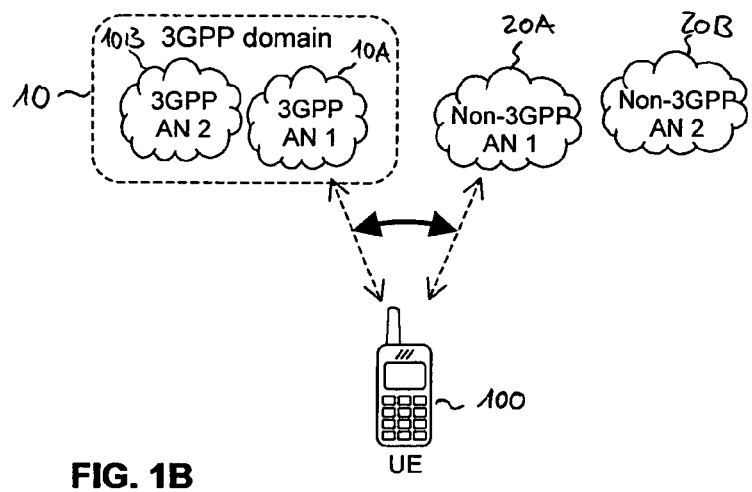
Figure 1C:
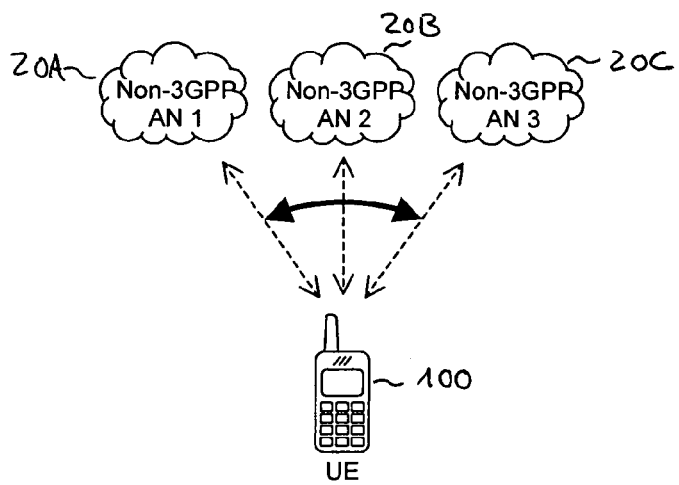

FIGS. 1A, 1B, and 1C schematically illustrate different scenarios of access network selection which may occur in a multi-access network environment of the above-mentioned type.

FIG. 1A illustrates the selection between multiple 3GPP accesses, e.g. LTE, HSPA, WCDMA, GERAN, GSM. This type of access selection may also involve the 3GPP2 access CDMA2000. As illustrated a UE 100 may select between a first 3GPP access network 10A, a second 3GPP access network 10B, and a third 3GPP access network 10C. That is to say, in this case the selection occurs within a 3GPP domain 10.

FIG. 1B illustrates a selection between 3GPP and non-3GPP accesses. The non-3GPP accesses may include, e.g., a WiMAX access or a WLAN access. As illustrated, the user equipment 100 may select between access networks of the 3GPP domain 10, i.e. a first 3GPP access network 10A and a second 3GPP access network 10B, and non-3GPP access networks, i.e. a first non-3GPP access network 20A and a second non-3GPP access network 20B.

FIG. 1C illustrates the selection between multiple non-3GPP accesses. As illustrated, the user equipment 100 may select between a first non-3GPP access network 20A, a second non-3GPP access network 20B, and a third non-3GPP access network 20C.

The selection process of FIG. 1A is referred to as intra-3GPP access selection or simply 3GPP access selection, the selection process of FIG. 1B is referred to as extra-3GPP access selection, and the selection process of FIG. 1C is referred to as non-3GPP access selection. Extra-3GPP access selection and non-3GPP access selection are collectively referred to as the ANDSF based access selection because they are controlled by the functionality as provided by the ANDSF.

Figure 2:
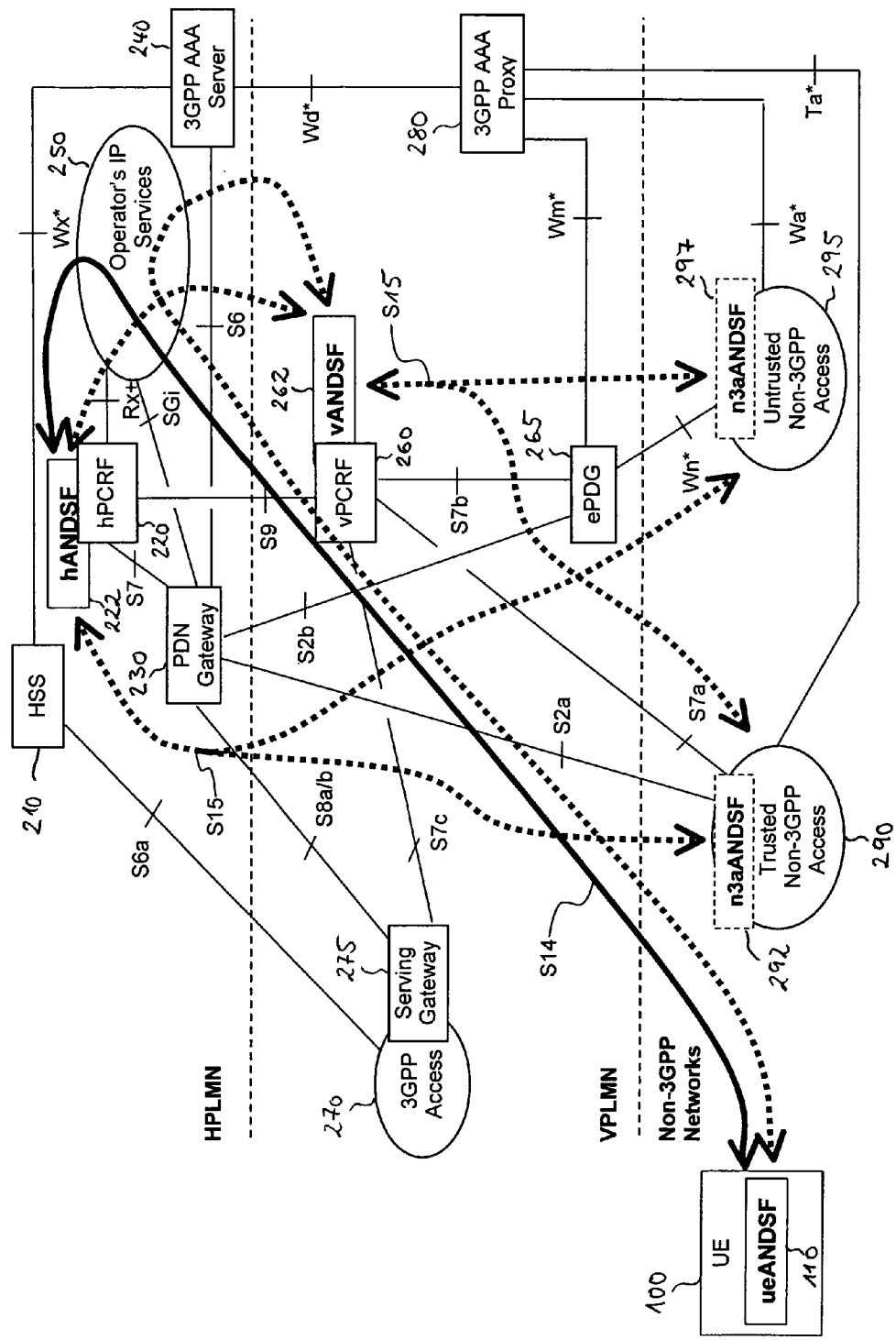
FIG. 2 schematically illustrates the ANDSF in the 3GPP SAE architecture and the most basic related information flows.

FIG. 2 schematically illustrates the ANDSF in the 3GPP SAE architecture, as well as the most basic related information flows. Further information can be obtained from the above-mentioned 3GPP technical specifications.

The architecture as illustrated in FIG. 2 comprises a HPLMN domain (HPLMN: home public land mobile network), a VPLMN domain (VPLMN: visited public land mobile network), and a domain of non-3GPP networks. The different domains are separated by horizontal dashed lines.

The HPLMN domain comprises a home subscriber server (HSS) 210, a home policy and charging rules function (hPCRF) 220, a packet data network (PDN) gateway 230, and a 3GPP AAA server 240 (AAA: authentication, authorization and accounting). An operator's internet protocol (IP) services are denoted by 250 and may comprise, e.g., an IP multimedia sub-system (IMS), and a packet switched streaming service (PSS). The HPLMN domain also comprises a hANDSF, denoted by 222, which may be implemented in the hPCRF 220 or as a separate functional entity.

The VPLMN domain comprises a visited policy and charging rules function (vPCRF) 260, an evolved packet data gateway (ePDG) 265, a 3GPP access 270 with a serving gateway 275, and a 3GPP AAA proxy 280. The VPLMN domain also comprises a vANDSF, denoted by 262, which may be implemented in the vPCRF 260 or as a separate functional entity.

The domain of non-3GPP networks comprises a trusted non-3GPP access 290 and an untrusted non-3GPP access 295, optionally provided with an n3aANDSF 292 and 297, respectively.

Finally, FIG. 2 also illustrates the UE 100 which is provided with a ueANDSF 110.

The illustrated entities and components communicate via reference points or signal interfaces, denoted by S1, S2a, S2b, S6, S6a, S7, S7a, S7b, S7c, S8a/b, S9, S14, S15, SGi, Ta*, rx+, Wa*, Wd*, Wm*, Wx*. These are further explained in the above-mentioned 3GPP technical specifications.

Processing of policies and/or rules in the ANDSF may take place either in the network, in the UE 100 or in both. In one scenario at least the final processing will take place in the UE 100 where the access selection decision is executed. The UE 100 communicates with the hANDSF 222, e.g. to receive policy and rule information. The vANDSF 262 and the hANDSF 222 may also communicate such information between each other, but a possible alternative is that the UE 100 communicates directly with the vANDSF 262. Note, however, that different implementations are possible and for example the vANDSF 262 or the n3aANDSF 292, 297 could be omitted.

The ANDSF based access selection functionality can execute its access selection decision as an IP mobility mechanism. The IP mobility mechanism can be for example, Mobile Internet Protocol version 6 (MIPv6), Proxy Mobile Internet Protocol version 6 (PMIPv6), Dual-Stack Mobile Internet Protocol version 6 (DSMIPv6), Mobile Internet Protocol version 4 (MIPv4) or Proxy Mobile Internet Protocol version 4 (PMIPv4). The ANDSF based access selection functionality may also include policies/rules defining if and when to scan for available access networks.

Figure 3:
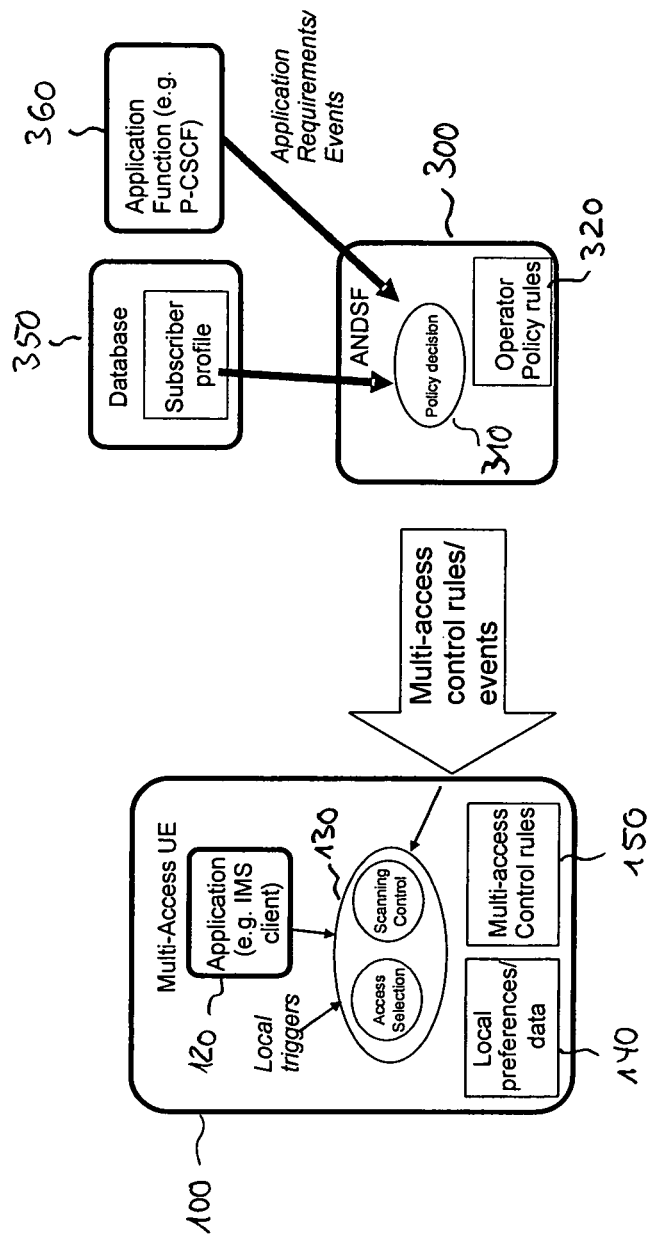
FIG. 3 schematically illustrates an exemplary ANDSF based multi-access policy and rule control architecture as used according to an embodiment of the present invention.

FIG. 3 schematically illustrates an exemplary ANDSF based multi-access policy and rule control architecture.

As illustrated, the architecture comprises the multi-access UE 100, the ANDSF 300, a data base 350, and an application function 360, e.g. a proxy call session control function (P-CSCF). The ANDSF may be a hANDSF, a vANDSF, or an n3aANDSF. The data base 350 stores a subscriber profile. The application function 360 provides the ANDSF 300 with application requirements and indicates events. The ANDSF stores operator policy rules 320 and comprises a policy decision function 310 which makes policy decisions based on the policy rules, the subscriber profile and the application requirements. Based on the policy decisions, multi-access control rules/events are generated, which are supplied to the multi-access UE 100.

The multi-access UE 100 executes an application, denoted by 120, e.g. an IMS client. The UE 100 stores local preferences and data 140 and multi-access control rules 150 as supplied from the ANDSF 300.

An access selection and scanning control function 130 of the multi-access UE 100 makes access selection and scanning control decisions based on the multi-access control rules and the local preferences. In addition, the access selection and scanning control function may receive data from the application 120 and may be supplied with local triggers, which are taken into account in the decision process.

The 3GPP access selection function is implemented separately from the ANDSF. This access selection function is network based and typically located within the RANs, e.g. within an E-UTRAN, a GERAN, a UTRAN, a CDMA2000-RAN, and possibly partly also in the MME and/or the SGSN.

Figure 4:
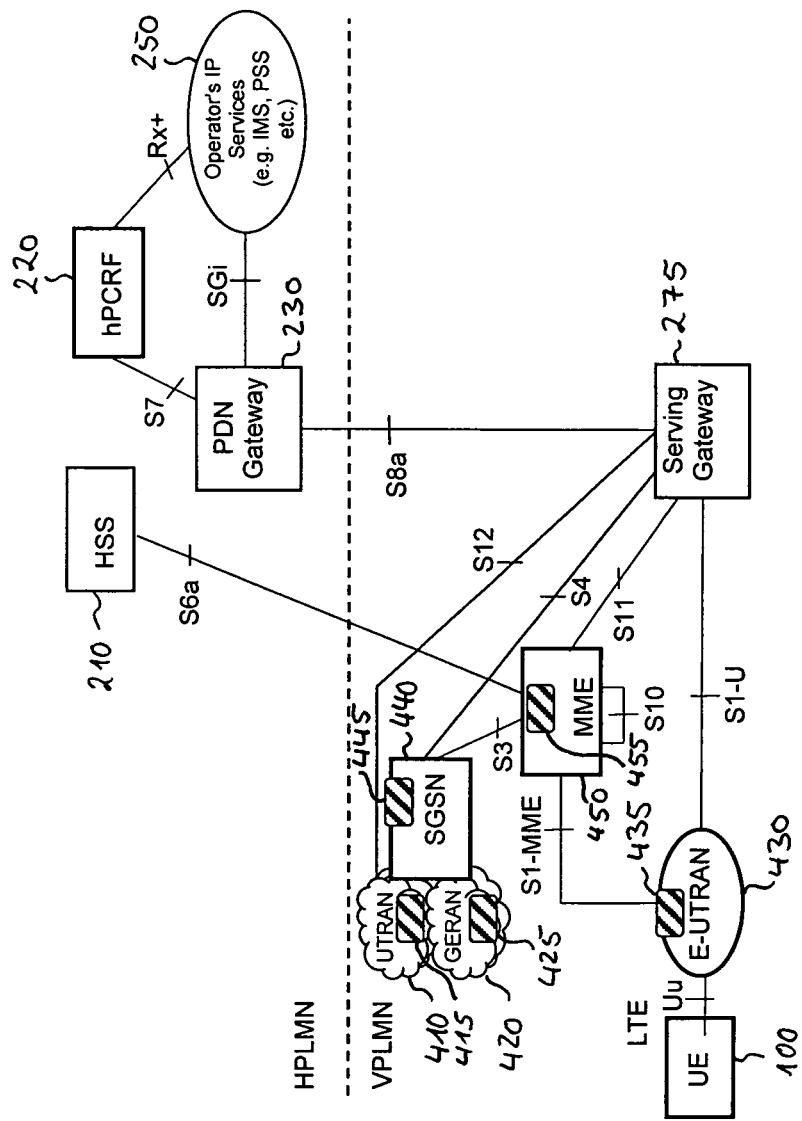
FIG. 4 schematically illustrates the SAE architecture with the access selection functionality for selecting between accesses interworking on RAN level as used according to embodiments of the invention.

FIG. 4 schematically illustrates the SAE architecture with the 3GPP access selection functionality for selection between accesses interworking on RAN level. Similar to the architecture of FIG. 2, the architecture comprises a HPLMN domain and a VPLMN domain, which are separated by a horizontal dashed line. FIG. 4 illustrates a roaming scenario, where access networks in the VPLMN domain, but not in the HPLMN domain are utilized. However, it is to be understood that other scenarios are possible in which access networks from both the VPLMN domain and the HPLMN domain are utilized.

The HPLMN domain comprises the HSS 210, the hPCRF 220, the PDN gateway 230, and the operator IP services 250.

The VPLMN domain comprises an UTRAN 410, a GERAN 420, a E-UTRAN 430, an SGSN 440, a MME 450 with corresponding access selection functionality for accesses interworking on RAN level, denoted by 415, 425, 435, 445, and 454, respectively. In addition, the VPLMN domain comprises the serving gateway 275.

In addition, FIG. 4 also illustrates the UE 100. For example, the UE may communicate with the E-UTRAN 430 using the LTE access technology.

In FIG. 4, reference points or signal interfaces for establishing communication between the illustrated components and entities are denoted by S1-U, S1-MME, S3, S4, S6a, S7, S8a, S12, SGi, Rx+, and Uu. These are further explained in the 3GPP above-mentioned technical specifications.

In the following, a solution will be proposed which allows for preventing access selection loops in the multi-access network environment which uses the 3GPP access selection functionality and the ANDSF based access selection functionality.

Figure 5:
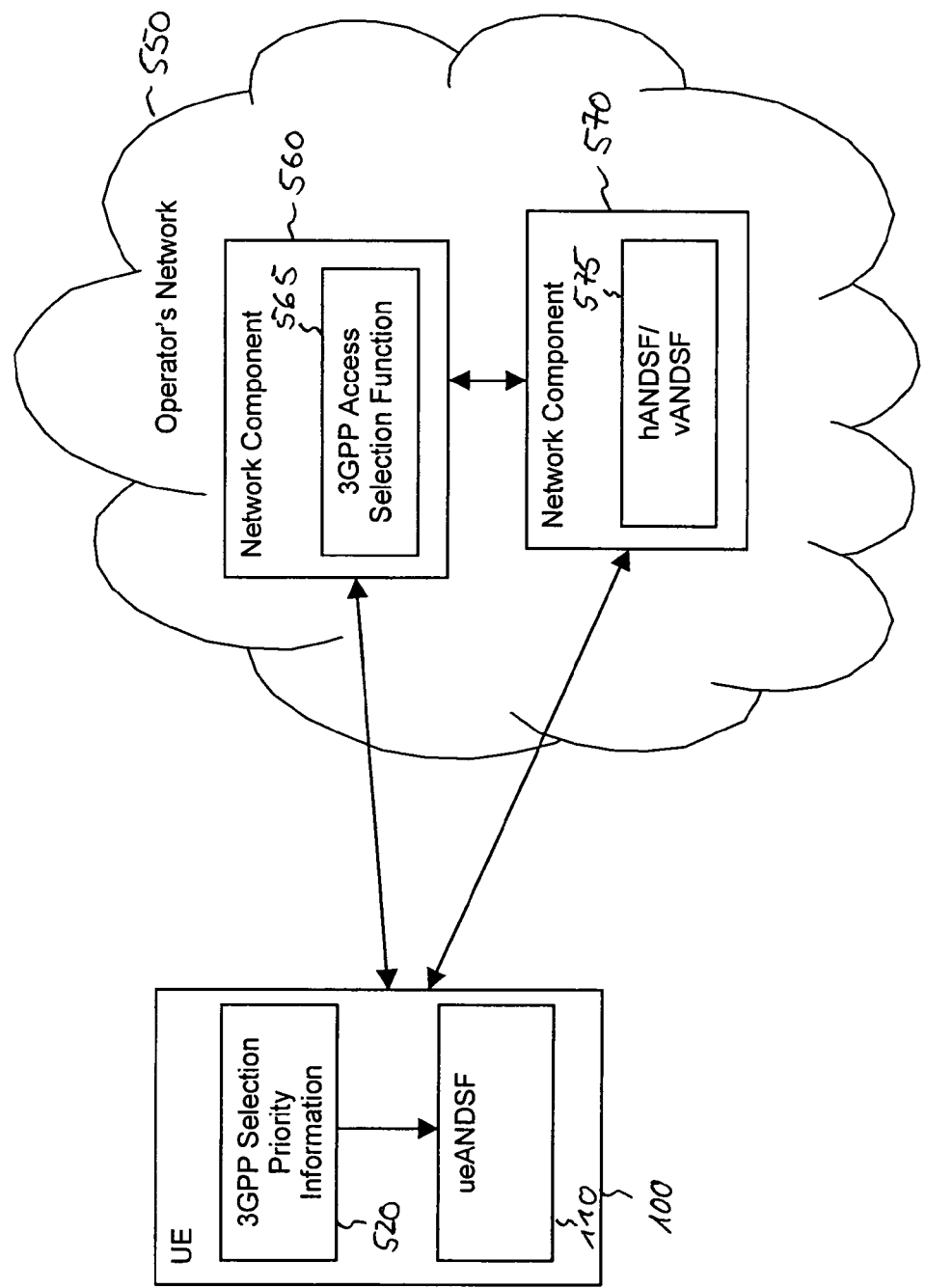
FIG. 5 schematically illustrates a network system according to an embodiment of the invention.

FIG. 5 schematically illustrates a network system which implements the proposed solution.

The network system comprises the UE 100 and a first network component 560 and a second network component 570 of an operator's network 550. The first network component 560 implements at least a part of the 3GPP access selection functionality 565, and may be part of the UTRAN, the GERAN, the E-UTRAN, the SGSN, or the MME. The second network component 570 implements at least a portion of the ANDSF based access selection functionality 575, in particular the hANDSF or the vANDSF. Accordingly, the second network component 570 may be implemented as a part of a hPRCF or a vPRCF, as for example illustrated in FIG. 2.

As further illustrated, the UE 100 comprises the ueANDSF and a memory 520 storing a 3GPP selection priority information of the 3GPP access selection function. The memory may also be referred to as 3GPP access preference cache. The 3GPP selection priority information is supplied to the ueANDSF 110 so as to be taken into account in the ANDSF based access selection functionality.

Note that the network system of FIG. 5 is one example and other examples are conceivable, e.g. that the network implements the memory 520 storing 3GPP access priority information (i.e. the 3GPP access preference cache) as a part of the ueANDSF.

In the proposed solution it is the task of the ANDSF based access selection functionality to "observe" the 3GPP access selection functionality and use the conclusions of its observations to avoid or break access selection loops. The observations consist of tracking how the UE is directed/handed over between different 3GPP accesses. To draw appropriate and useful conclusions the ANDSF based access selection functionality can also extend, or generalize, its knowledge about available accesses and/or make intelligent assumptions about them.

Figure 6:
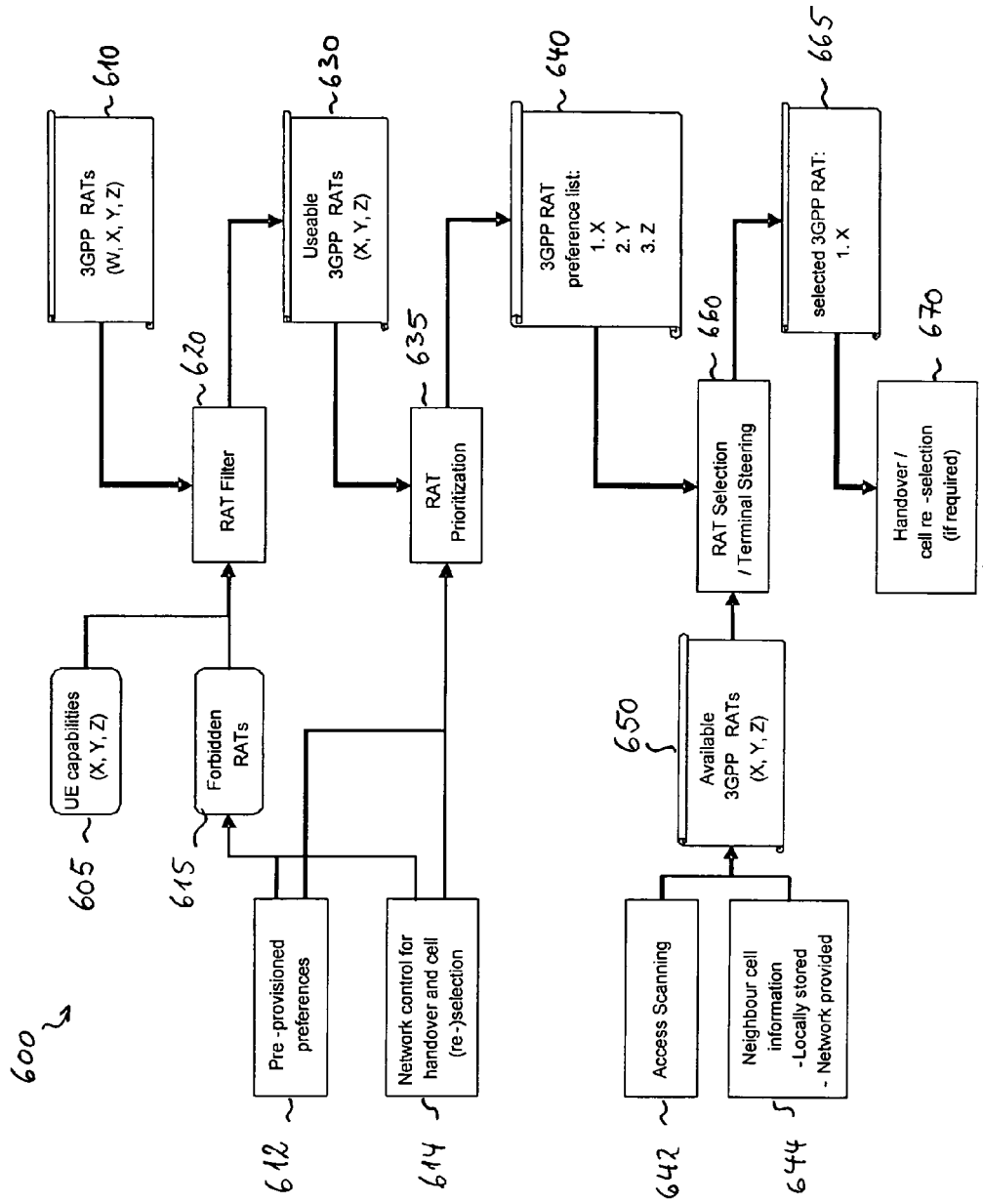
FIG. 6 schematically illustrates an exemplary procedure for 3GPP access selection according to an embodiment of the invention.
Figure 7:
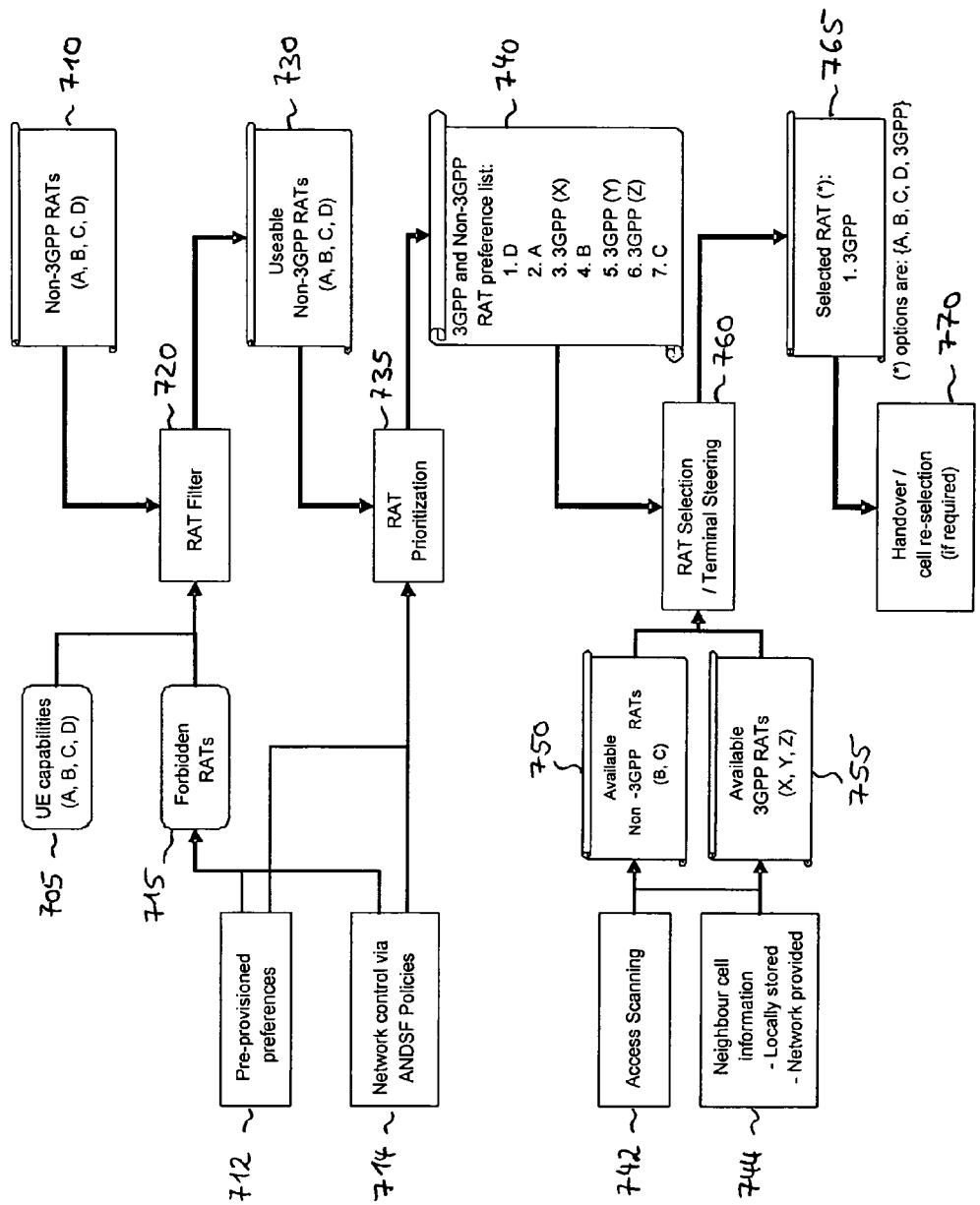
FIG. 7 schematically illustrates an exemplary procedure for ANDSF based access selection according to an embodiment of the invention.
Figure 8:
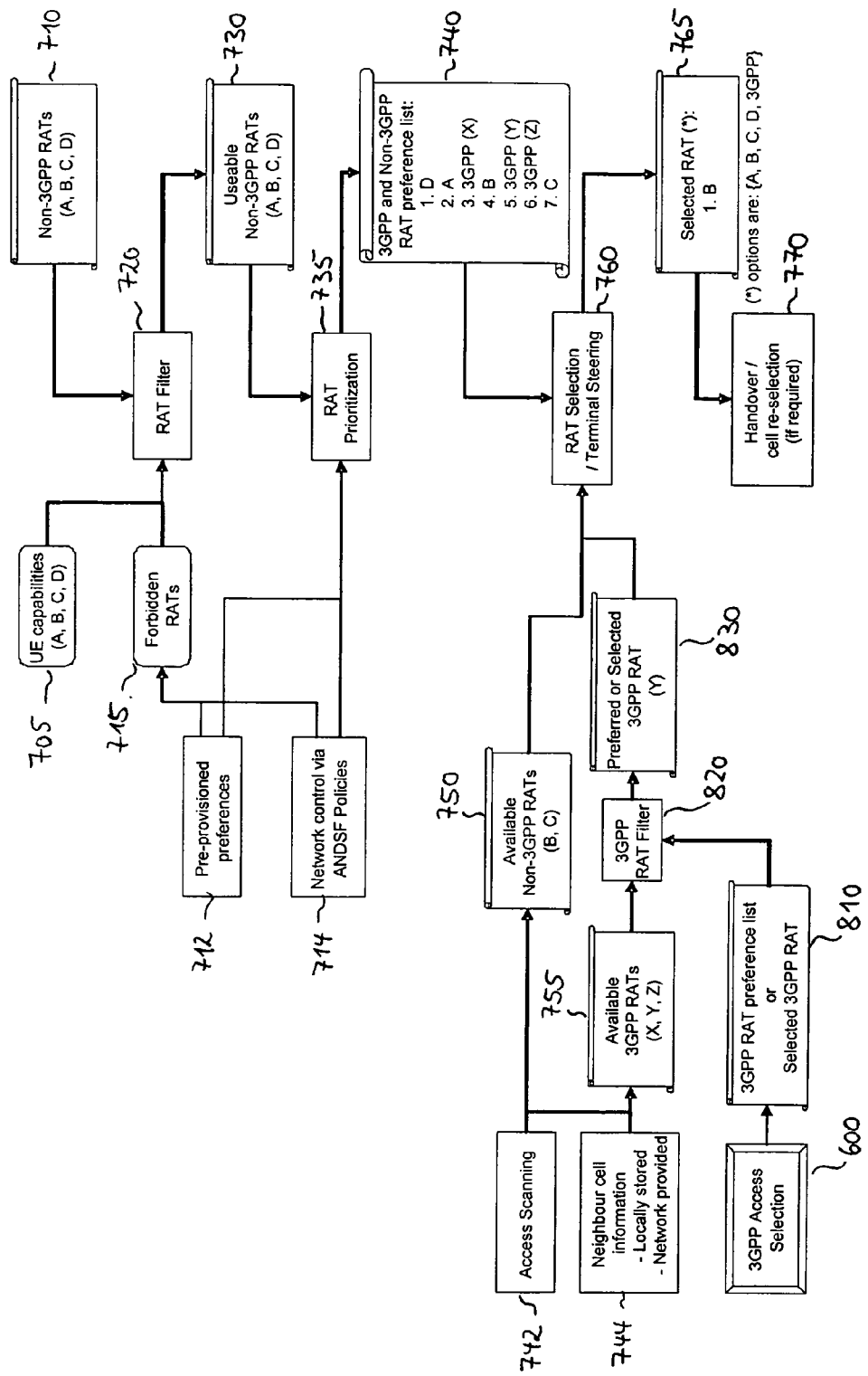
FIG. 8 schematically illustrates an exemplary procedure for ANDSF based access selection according to an embodiment of the invention, which is aware of the 3GPP access selection preference.

According to an embodiment of the invention as illustrated in FIGS. 6-8, the 3GPP accesses used in the ANDSF-based access selection scheme are replaced with the outcome of the 3GPP access selection process. For this purpose a 3GPP access selection procedure and an ANDSF-based access selection procedure are coupled. FIG. 6 shows an exemplary implementation of the 3GPP access selection function and FIG. 7 shows an exemplary implementation of the ANDSF-based access selection function. An exemplary implementation of procedure resulting from the coupling of the procedures of FIGS. 6 and 7 is shown in FIG. 8.

In FIGS. 6-8, the term "RAT" refers to a combination of access technology and access technology characteristics (e.g. frequency carrier, bandwidth, version/profile, operator, etc.). The same selection procedures can also be used for selecting between different RANs, e.g. different WLANs In the 3GPP access selection procedure 600 of FIG. 6, at step 605 UE capabilities are specified. In the illustrated example, it is specified that UE is capable of using the RATs X, Y and Z.

At step 610, a list of possible 3GPP RATs is provided, in the illustrated example RATs W, X, Y, and Z.

At step 612, pre-provisioned preferences are provided, and in step 614 network control information for handover and cell (re-)selection is obtained.

At step 615, on the basis of the pre-provisioned preferences of step 612, and on the basis of the network control information of step 614, forbidden RATs are identified.

In step 620, the list of 3GPP RATs of step 610 is supplied to a RAT filter so as to filter out the forbidden RATs of step 615. This results in a list of usable 3GPP RATs of step 630, in the illustrated example the RATs X, Y, and Z.

In step 635, the list of usable 3GPP RATs of step 630 is subjected to a RAT prioritization. This is accomplished on the basis of the prepositioned preferences of step 612 and on the basis of the network control information of step 614. The result is the 3GPP RAT preference list of step 640, which in the illustrated example gives the following priority order:

1. X
2. Y
3. Z

In step 642 access scanning is accomplished, and in step 644 locally stored and/or network provided neighbour cell information is obtained. The resulting information is used to obtain a list of available 3GPP RATs in step 650. In the illustrated example, the available 3GPP RATs are the RATs X, Y, and Z.

In step 660, the 3GPP RAT preference list of step 640 and the list of available 3GPP RATs of step 650 are subjected to a RAT selection/terminal steering process. The result is a selected 3GPP RAT of step 665, in the illustrated example RAT X.

In step 670, the selected 3GPP RAT of step 665 is used to control handover or cell re-selection. For example, if the presently used 3GPP RAT does not correspond to the selected 3GPP RAT of step 665, a handover or cell re-selection may be initiated.

In the ANDSF based access selection procedure of FIG. 7, at step 705 UE capabilities are defined in step 705. In the illustrated example, the UE is capable of using the non-3GPP RATs A, B, C, and D. In step 710, a list of possible non-3GPP RATs is provided, in the illustrated example non-3GPP RATs A, B, C, D.

In step 712, pre-provisioned preferences are provided, and in step 714 network control information is obtained via ANDSF policies. On the basis of the pre-provisioned preferences of step 712 and the network control information of step 714, forbidden RATs are identified at step 715.

In step 720, the list of non-3GPP RATs of step 710 is supplied to a RAT filter so as to filter out the forbidden RATs of step 715. The result is the list of usable non-3GPP RATs of step 730, which in the illustrated example includes the non-3GPP RATs A, B, C, and D.

In step 735, the list of usable non-3GPP RATs of step 730 is subjected to a RAT prioritization. This is accomplished on the basis of the pre-provisioned preferences of step 712 and the network control information of step 714. The result is a list of 3GPP and non-3GPP RAT preference list of step 740. In the illustrated example, the list defines the following priority order:

1. D
2. A
3. 3GPP (X)
4. B
5. 3GPP (Y)
6. 3GPP (Z)
7. C

In step 742, access scanning is accomplished, and in step 744 locally stored and/or network provided neighbour cell information is obtained.

In step 750, a list of available non-3GPP RATs is obtained on the basis of the access scanning information from step 742 and the neighbour cell information from step 744. In the illustrated example, the available non-3GPP RATs are the RATs B and C.

Similarly, in step 755, a list of available 3GPP RATs is obtained on the basis of the access scanning information from step 742 and the neighbour cell information from step 744.

In step 760, the 3GPP and non-3GPP RAT preference list of step 740, the list of available non-3GPP RATs of step 750, and the list of available 3GPP RATs of step 755 are subjected to a RAT selection/terminal steering process. The result is a selected RAT of step 765. The selection options are the RATs A, B, C, and D, and 3GPP. The latter option means that a 3GPP RAT is selected, without specifying a specific 3GPP RAT.

In step 770, a handover or cell re-selection process is controlled on the basis of the selected RAT of step 765.

In FIG. 8, the 3GPP access selection procedure of FIG. 6 and the ANDSF based access selection procedure of FIG. 7 are coupled. Those steps which have already been explained in connection with FIG. 7 have been designated with the same reference signs and the repeated description thereof will be omitted.

In FIG. 8, a result of the 3GPP access selection procedure 600 is supplied to the ANDSF based access selection procedure in the form of a 3GPP RAT preference list or a selected 3GPP RAT, as obtained in step 640 or 665 of the 3GPP access selection procedure 600.

In step 820, the 3GPP RAT preference list of selected 3GPP RAT of step 810 and the list of available 3GPP RATs of step 755 are supplied to a 3GPP RAT filter so as to obtain the available 3GPP RAT having the highest priority according to the 3GPP access selection function. This result is given in step 830. In the illustrated example, the preferred or selected 3GPP RAT is the RAT Y.

The preferred or selected 3GPP RAT of step 830 and the list of available non-3GPP RATs of step 750 are subjected to the RAT selection/terminal steering process of step 760. The result in step 765 is a selected RAT. In the illustrated example, this is the RAT B.

As can be seen, in the procedure of FIG. 8 the ANDSF-based access selection process does not consider all 3GPP accesses that are available for the UE in the access selection decision. Instead it only considers the 3GPP access which is currently selected, or the one which is preferred according to the 3GPP access selection process.

In particular it should be noted that the selected RAT in FIG. 7 and FIG. 8 is different. Both in FIGS. 7 and 8 RAT D and A which are the highest entries in the ANDSF preference list are not selected because they were not detected as available.

However, the process in FIG. 7 selects then a 3GPP RAT which is the next highest entry in the ANDSF preference list. In contrast the process in FIG. 8 detects that the preferred or selected 3GPP RAT is RAT Y which corresponds to a lower position in the ANDSF preference list, here position 5, and only RAT Y is considered in the ANDSF selection process. Therefore RAT B is instead selected in FIG. 8 because it has a higher priority than the preferred or selected 3GPP RAT.

According to a further embodiment, when an access has been detected (e.g. through scanning or other explicit indication), the ANDSF based access selection functionality considers it as available for a certain time, $T_{available}$, without any explicit confirming indications. The value of $T_{available}$ may be access specific, e.g. greater for accesses which normally have large coverage areas and smaller for access types which normally are short-range with spotty coverage, but it may also be the same for all accesses. A timer is provided for measuring when the time $T_{available}$ has elapsed. This timer is referred to as an access availability timer.

In addition, an actively used access (i.e. an access which the UE is connected to in active mode or actively communicating through) is also considered as available and its access availability timer is not started until the UE disconnects from the concerned access or leaves the active mode for the access.

Furthermore, an access for which the UE detects loss of signal (e.g. LTE reference signals or WLAN beacons) or a reduction of the received signal strength below a certain threshold (which may be access specific), the UE should interpret this as an explicit indication of unavailability and should consider the access as unavailable irrespective of the value of any running access availability timer for the access.

According to the embodiment, the UE may track only the availability of 3GPP accesses in the manner described above. However, the same may be done for non-3GPP accesses.

While a UE is connected to the 3GPP domain, the ANDSF based access selection functionality learns which 3GPP access the 3GPP access selection functionality chooses to use; this is achieved by observation of how the 3GPP accesses are used by the UE, or by receiving explicit information about the 3GPP access priority setting. When the UE leaves the 3GPP domain, e.g. because it is handed over to a non-3GPP access, the ANDSF based access selection functionality notes the following:
 the preferred 3GPP access for the UE (i.e. the one used before handing over to non-3GPP);
 the currently available 3GPP accesses; and
 the current relevant contextual parameters.

In this context, the "relevant" contextual parameters may consist of only the active application(s) (i.e. the communicating application(s)), but any other contextual parameters, such as geographic location, velocity, PLMN, time of day, and/or day of the week may be included.

In a simultaneous multi-access scenario where the UE may be connected to a 3GPP access and one or more non-3GPP accesses simultaneously only the application(s) (or application flow(s)) communicating over the 3GPP access is (are) relevant and stored.

The ANDSF based access selection functionality uses the above listed data to create a temporary entry in a cache, which is herein denoted as 3GPP access preference cache. The purpose of the cache entry is to record the conclusion that the ANDSF based access selection functionality can draw from its observations. For instance, if the UE was using 3GPP access X before it left the 3GPP domain and 3GPP accesses Y and Z were also available, the ANDSF based access selection functionality concludes that in the current situation (i.e. with the current contextual parameters) the 3GPP access selection functionality prefers 3GPP access X to 3GPP accesses Y and Z. This conclusion is stored in the newly created cache entry. The ANDSF based access selection functionality may also store the available 3GPP accesses and the current relevant contextual parameters in the cache entry, but if any of this data is stored in other ways, where it is accessible for the ANDSF based access selection functionality, it may be omitted in the cache entry.

As long as the entry is stored in the 3GPP access preference cache the ANDSF based access selection functionality uses it as a guideline (in addition to its regular policies/rules) when considering handing over the UE to a 3GPP access. In this example this means that as long as the entry remains in the cache, the ANDSF based access selection functionality will not hand over the UE to 3GPP access Y or Z if 3GPP access X is available—not even if any of 3GPP accesses Y or Z has a higher priority (in the view of the ANDSF based access selection functionality) than the available non-3GPP accesses. It also means that if 3GPP access X has lower priority (in the view of the ANDSF based access selection functionality) than at least one of the available non-3GPP accesses, the ANDSF based access selection functionality will not hand over the UE to the 3GPP domain.

The 3GPP access preference recorded in the cache entry is not permanent. If relevant circumstances change, the 3GPP access selection functionality also may change its preferences and in particular its relative priority order of the 3GPP accesses concerned in the cache entry (i.e. the relative priority order of 3GPP accesses X, Y and Z in the example). Therefore the cache entry is removed when an event occurs that is likely to impact the preferences of the 3GPP access selection functionality.

Such "relevant events" include changes in the relevant contextual parameters that are stored in the 3GPP access preference cache entry (or elsewhere accessible for the ANDSF based access selection functionality).

Depending on the nature of the concerned contextual parameter the ANDSF based access selection functionality may have to use a certain margin or threshold, which Must be passed in order for the change to be significant enough to trigger removal of a 3GPP access preference cache entry.

As stated above, the contextual parameters typically only include the active application(s), but may also include other parameters. Hence, if one of the active applications is terminated or if a new one is started or if the communication characteristics of an active application are significantly changed (e.g. a media component added or dropped), the 3GPP access preference cache entry can be deleted depending on the particular embodiment. Here, it should be noted that in a simultaneous multi-access scenario where the UE may be connected to a 3GPP access and one or more non-3GPP accesses simultaneously only changes in the applications communicating over the 3GPP access impact the 3GPP preference cache.

The 3GPP access preference cache entry is also deleted if the ANDSF based access selection functionality directly observes a change in the preferences of the 3GPP access selection functionality that are recorded in the cache entry (e.g. an observation that X is no longer preferred to Y and Z in the example). In the example above the ANDSF based access selection functionality may for instance observe that the 3GPP access selection functionality selects 3GPP access Y (instead of X) out of the available 3GPP accesses X, Y and Z and then the ANDSF based access selection functionality consequently removes the 3GPP access preference cache entry indicating that 3GPP access X is preferred over Y and Z.

In the absence of relevant events the lifetime of the created cache entry is limited to $T_{3GPP-Pref-lifetime}$. Hence a timer, also referred to as 3GPP preference timer, is started when a 3GPP access preference cache entry is created. If the 3GPP preference timer expires (indicating that the time $T_{3GPP-Pref-lifetime}$ has elapsed since the cache entry was created), the cache entry is deleted. The 3GPP preference timer may be restarted before it expires if the ANDSF based access selection functionality observes an indication that confirms the 3GPP access preferences that are recorded in the cache.

A 3GPP access preference cache entry removal should preferably trigger the ANDSF based access selection functionality to consider change of access (i.e. it may now be useful to switch to the 3GPP domain so an evaluation of this is appropriate), provided that the UE is currently connected to a non-3GPP access. If the cache entry removal was due to a contextual change, then the contextual change in itself is probably enough to trigger such evaluations, but if the cache entry is timed out, the actual removal of the cache entry is the only trigger.

It should be noted that even though changes in the availability of accesses do not trigger removal of a 3GPP access preference cache entry, they may impact the ANDSF based access selection functionality's decisions whether or not to hand over a UE to the 3GPP domain. To illustrate this, consider the following examples.

The 3GPP accesses X, Y and Z and the non-3GPP accesses A and B are available. The UE is connected to non-3GPP access A and the ANDSF based access selection functionality has recorded in the 3GPP access preference cache that the 3GPP access selection functionality prefers 3GPP access X to Y and Z. Furthermore, the relative priority order of the available accesses according to the ANDSF based access selection functionality is (with highest priority listed first) Y, A, X, B, Z.

In accordance with the described solution the ANDSF based access selection functionality does not hand over the UE to 3GPP access Y (even though it has higher priority than non-3GPP access A), because of the recorded information in the 3GPP access preference cache which indicates that the 3GPP access selection functionality would hand over the UE from 3GPP access Y to X, which according to the ANDSF based access selection functionality has a lower priority than the currently used non-3GPP access A. Nor does it hand over the UE to 3GPP access X because ANDSF based access selection functionality prefers the currently used non-3GPP access A to 3GPP access X.

Assume now that non-3GPP access A becomes unavailable. The ANDSF based access selection functionality then has the choice to hand over the UE either to non-3GPP access B or to the 3GPP domain. Since 3GPP access X (which according to the 3GPP access preference cache entry will be the end result of a handover to the 3GPP domain) according to the ANDSF based access selection functionality has higher priority than non-3GPP access B, the ANDSF based access selection functionality chooses to hand over the UE to 3GPP access X.

Consider again the same example, but instead of non-3GPP access A becoming unavailable the new 3GPP access Q becomes available. According to the priorities of the ANDSF based access selection functionality the new access Q has higher priority than A but lower than Y (i.e. the relative priority order of the available accesses are Y, Q, A, X, B, Z according to the ANDSF based access selection functionality). Since there is now an available 3GPP access which has a higher priority than the currently used non-3GPP access and which is not disqualified by information in the 3GPP access preference cache, the ANDSF based access selection functionality chooses to hand over the UE to the 3GPP domain. Still it does not hand over the UE to the highest priority access Y (since this is still disqualified by the 3GPP access preference cache), but to the new 3GPP access Q.

The result would have been the same if the new 3GPP access Q instead would have had a higher priority than Y (i.e. if the relative priority order of the available accesses would have been Q, Y, A, X, B, Z according to the ANDSF based access selection functionality), but if Q would have had lower priority than A, then the ANDSF based access selection functionality would not have handed over the UE.

Figure 9:
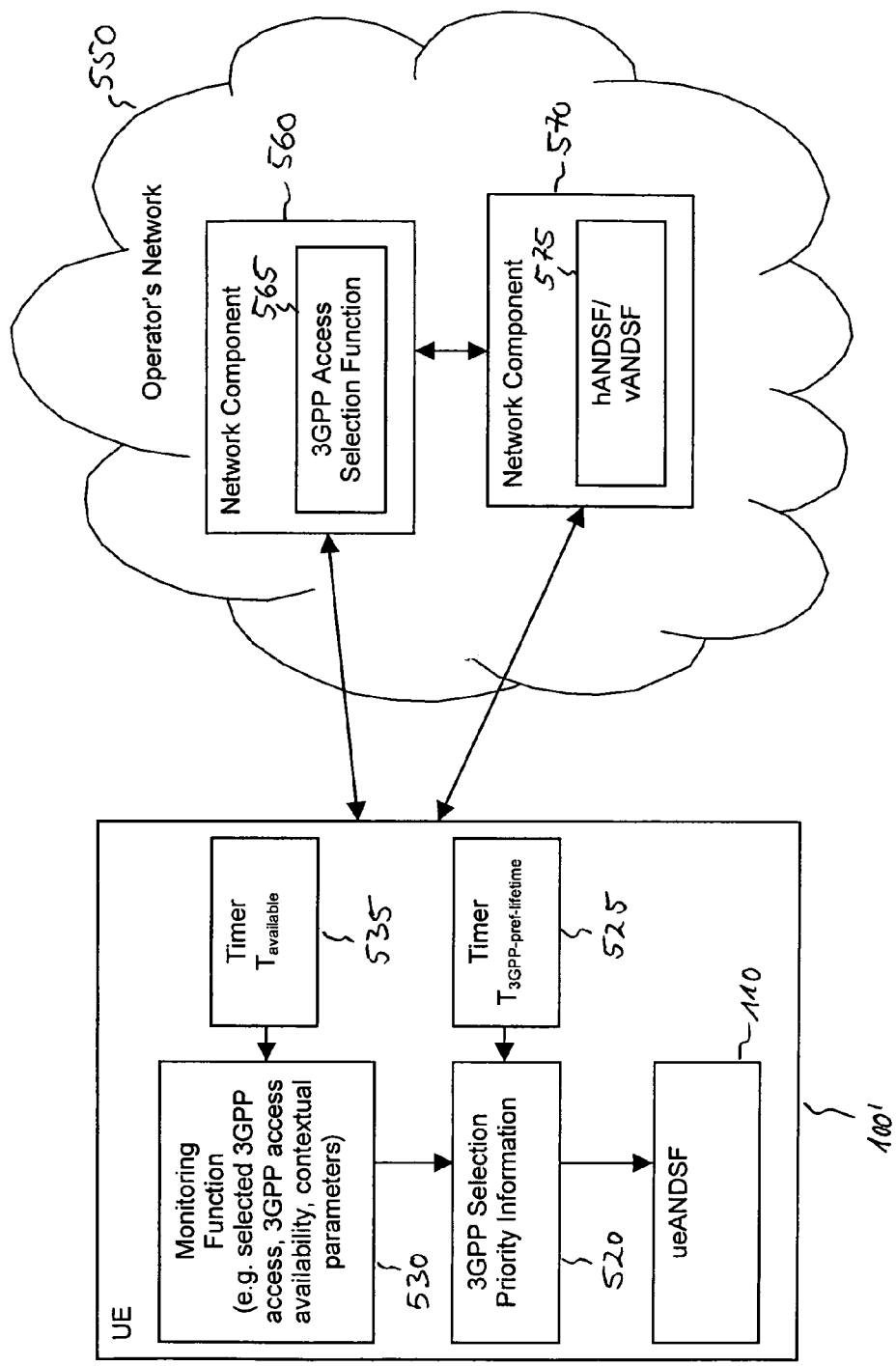
FIG. 9 schematically illustrates a network system according to a further embodiment of the invention.

FIG. 9 schematically illustrates a network system which constitutes an exemplary implementation of the above-embodiment. The network system generally corresponds to that of FIG. 5 and similar components are designated with the same reference signs.

As illustrated, the UE 100 of FIG. 5 has been replaced with a UE 100'. The UE 100' additionally comprises a monitoring function 530, the access availability timer 535, and the 3GPP preference timer 525. The monitoring function 530 accomplishes monitoring of parameters related to the 3GPP access selection function. For example, the presently selected 3GPP access, the availability of 3GPP accesses, and/or the contextual parameters may be evaluated. These are used as a basis for generating the 3GPP selection priority information stored in the access preference cache.

Other exemplary implementations of the above embodiment may include variations of the exemplary implementation of FIG. 9, e.g. that all or some of the related functions in the UE 100', i.e. monitoring function 530, the memory 520 storing the 3GPP selection priority information (i.e. the 3GPP access preference cache), the access availability timer 535 and the preference timer 525 are included in the ueANDSF 110. In yet another exemplary implementation the access availability timer 535 and the preference timer 525 are separate from the ueANDSF 110, but controlled by the ueANDSF 110.

Returning to the example of access selection loops as explained in the introductory portion one can conclude that if the concepts according to the above embodiment of the invention are used, the loop would be broken when the UE is handed over to WiMAX the second time, because at that point the ANDSF based access selection functionality would have recorded in the 3GPP access preference cache that the 3GPP access selection functionality prefers WCDMA to LTE and since WCDMA according to the ANDSF based access selection functionality has lower priority than WiMAX, there would be no point in handing over the UE to LTE (or any other access in the 3GPP domain).

It is to be understood, that the features of the above-described embodiments may also be combined with each other as appropriate.

The concepts according to the above embodiments of the invention would typically be implemented in the ueANDSF, i.e. in the ANDSF based access selection functionality in the UE, but implementation in the network based part of the ANDSF functionality or an implementation distributed between the UE and the network is also conceivable, depending on how the overall responsibilities for the access selection process are divided between the UE based and network based parts of the ANDSF functionality.

It is to be understood that the result of an access selection by any of the described access selection functions in any of the above-described embodiments typically is a particular access network (e.g. a RAN), or possibly multiple access networks in case of simultaneous multi-access, for a UE in active mode. Further, access selection results in terms of access network discovery instructions, guidelines or recommendations may indicate one or more particular access networks to scan for or one or more access technologies to scan for.

ABBREVIATIONS

3GPP $3^{rd}$ Generation Partnership Project
3GPP2 $3^{rd}$ Generation Partnership Project 2 (The standardization body standardizing CDMA2000.)
AAA Authentication, Authorization and Accounting
AN Access Network
ANDSF Access Network Discovery and Selection Function
CDMA Code Division Multiple Access
CDMA2000 Cellular network standard based on CDMA
DSMIPv6 Dual-Stack Mobile IPv6
EDGE Enhanced Data rates for GSM Evolution
ePDG Evolved Packet Data Gateway
EPS Evolved Packet System
E-UTRA Evolved Universal Terrestrial Radio Access
E-UTRAN Evolved Universal Terrestrial Radio Access Network
GERAN GSM EDGE Radio Access Network
GPRS General Packet Radio Service
GSM Global System for Mobile communication
hANDSF Home ANDSF (ANDSF functionality in the home network)
hPCRF Home PCRF (PCRF in the home network)
HPLMN Home Public Land Mobile Network
HSPA High Speed Packet Access HSS Home Subscriber Server
IMS IP Multimedia Subsystem
IP Internet Protocol
IPv4 Internet Protocol version 4
IPv6 Internet Protocol version 6
LTE Long Term Evolution
MIPv4 Mobile IPv4
MIPv6 Mobile IPv6
MME Mobility Management Entity
MS Mobile Station
n3aANDSF ANDSF functionality in a non-3GPP access network.
NAS Non-Access Stratum
PAN Personal Area Network
PCE Packet Core Evolution
PCR Packet Core Research
PCRF Policy and Charging Rules Function
P-CSCF Proxy Call Session Control Function
PDN Packet Data Network
PLMN Public Land Mobile Network
PMIPv4 Proxy Mobile IPv4
PMIPv6 Proxy Mobile IPv6
PSS Packet Switched Streaming Service
RAN Radio Access Network
RAT Radio Access Technology
RRC Radio Resource Control
SAE System Architecture Evolution
SGSN Serving GPRS Support Node
SIM Subscriber Identity Module
TS Technical Specification
UE User Equipment
ueANDSF ANDSF functionality in the UE.
UN User Network
USIM Universal Subscriber Identity Module
UTRAN Universal Terrestrial Radio Access Network
vANDSF Visited ANDSF (ANDSF functionality in the visited network)
vPCRF Visited PCRF (PCRF in the visited network)
VPLMN Visited Public Land Mobile Network
WCDMA Wideband Code Division Multiple Access
WiMAX Worldwide Interoperability for Microwave Access
WLAN Wireless Local Area Network

The invention claimed is:

1. A method of access network selection in a multi-access network environment with a plurality of access networks, the plurality of access networks comprising a first subgroup of access networks and a second subgroup of access networks which are not part of the first subgroup of access networks,
   wherein at least a first access selection function and a second access selection function are provided, the first access selection function being configured to select an access network from the first subgroup on the basis of a first set of selection rules and the second access selection function being configured to select at least one access network from both the first subgroup and the second subgroup on the basis of a second set of selection rules,
   wherein the method comprises:
   making a selection priority information of the first access selection function available to the second access selection function, wherein the selection priority information indicates a priority order with which the first access selection function selects access networks in the first subgroup.

2. The method according to claim 1,
   wherein in the second access selection function an access network from the first subgroup is only selected if no other access network of the first subgroup having a higher priority according to the first set of selection rules is available.

3. The method according to claim 1,
   wherein the selection priority information specifies an access network of the first subgroup which is selected according to the first access selection function, and
   wherein in the second access selection function those access networks of the first subgroup which according to the first set of selection rules have a lower priority than the selected access network are filtered out from the access networks from which the second access selection function selects on the basis of the second set of selection rules.

4. The method according to claim 1, further comprising:
   maintaining an availability information indicating which access networks of the first subgroup are available for a particular user equipment.

5. The method according to claim 1, further comprising:
   generating the selection priority information on the basis of an access network of the first subgroup which is used by a particular user equipment when the user equipment changes to an access network of the second subgroup.

6. The method according to claim 1, further comprising:
   generating the selection priority information on the basis of those access networks of the first subgroup which are available for a particular user equipment when the user equipment changes to an access network of the second subgroup.

7. The method according to claim 1, further comprising:
   generating the selection priority information on the basis of contextual parameters which are valid for a particular user equipment when the user equipment changes to an access network of the second subgroup, the contextual parameters being selected from the group comprising: an information on active applications of the user equipment, an information on the location of the user equipment, an information on the velocity of the user equipment, an information on the time of day, an information on the day of the week, and an information on a Public Land Mobile Network the user equipment is currently registered at.

8. The method of claim 1, wherein the first access selection function is a $3^{rd}$ Generation Partnership Projection (3GPP) access selection function, and wherein the second access selection function is an Access Network Discovery and Selection Function (ANDSF).

9. The method of claim 1, wherein the selection priority information indicates said priority order by indicating an access network selected by the first access selection function as having the highest priority among those access networks in the first subgroup that are currently available.

10. The method of claim 1, wherein the selection priority information indicates said priority order as a list of access networks in the first subgroup ordered according to the priority with which the first access selection function is configured to select them.

11. A network component for use in a multi-access network environment with a plurality of access networks, the plurality of access networks comprising a first subgroup of access networks and a second subgroup of access networks which are not part of the first subgroup of access networks,
   wherein the multi-access network environment provides at least a first access selection function and a second access selection function, the first access selection function being configured to select an access network from the first subgroup on the basis of a first set of selection rules and the second access selection function being configured to select an access network from both the first subgroup and the second subgroup on the basis of a second set of selection rules, and wherein the network component comprises one or more processors configured to make a selection priority information of the first access selection function available to the second access selection function, wherein the selection priority information indicates a priority order with which the first access selection function selects access networks in the first subgroup.

12. The network component according to claim 11, wherein the network component is configured to implement at least a portion of the second access selection function in such a way that an access network from the first subgroup is only selected if no other access network of the first subgroup having a higher priority according to the first set of selection rules is available.

13. The network component according to claim 11, wherein the selection priority information specifies an access network of the first subgroup which is selected according to the first access selection function, and wherein in the second access selection function those access networks of the first subgroup which according to the first set of selection rules have a lower priority than the selected access network are filtered out from the access networks from which the second access selection function selects on the basis of the second set of selection rules.

14. The network component according to claim 11, wherein the network component is configured to maintain an availability information indicating which access networks of the first subgroup are available for a particular user equipment.

15. The network component according to claim 11, wherein the network component is configured to generate the selection priority information on the basis of an access network of the first subgroup which is used by a particular user equipment when the user equipment changes to an access network of the second subgroup.

16. The network component according to claim 11, wherein the network component is configured to generate the selection priority information on the basis of those access networks of the first subgroup which are available for a particular user equipment when the user equipment changes to an access network of the second subgroup.

17. The network component according to claim 11, wherein the network component is configured to generate the selection priority information on the basis of contextual parameters which are valid for a particular user equipment when the user equipment changes to an access network of the second subgroup, the contextual parameters being selected from the group comprising: an information on active applications of the user equipment, an information on the location of the user equipment, an information on the velocity of the user equipment, an information on the time of day, an information on the day of the week, and an information on a Public Land Mobile Network the user equipment is currently registered at.

18. The network component of claim 11, wherein the first access selection function is a $3^{rd}$ Generation Partnership Projection (3GPP) access selection function, and wherein the second access selection function is an Access Network Discovery and Selection Function (ANDSF).

19. The network component of claim 11, wherein the selection priority information indicates said priority order by indicating an access network selected by the first access selection function as having the highest priority among those access networks in the first subgroup that are currently available.

20. The network component of claim 11, wherein the selection priority information indicates said priority order as a list of access networks in the first subgroup ordered according to the priority with which the first access selection function is configured to select them.

21. A user equipment for use in a multi-access network environment with a plurality of access networks, the plurality of access networks comprising a first subgroup of access networks and a second subgroup of access networks which are not part of the first subgroup of access networks, wherein the multi-access network environment provides at least a first access selection function and a second access selection function, the first access selection function being configured to select an access network from the first subgroup on the basis of a first set of selection rules and the second access selection function being configured to select at least one access network from both the first subgroup and the second subgroup on the basis of a second set of selection rules, and wherein the user equipment is configured to make a selection priority information of the first access selection function available to the second access selection function, wherein the selection priority information indicates a priority order with which the first access selection function selects access networks in the first subgroup.

22. The user equipment according to claim 21, wherein the user equipment is configured to implement at least a portion of the second access selection function in such a way that an access network from the first subgroup is only selected if no other access network of the first subgroup having a higher priority according to the first set of selection rules is available.

23. The user equipment according to claims 21, wherein the selection priority information specifies an access network of the first subgroup which is selected according to the first access selection function, and wherein in the second access selection function those access networks of the first subgroup which according to the first set of selection rules have a lower priority than the selected access network are filtered out from the access networks from which the second access selection function selects on the basis of the second set of selection rules.

24. The user equipment according to claim 21, wherein the user equipment is configured to maintain an availability information indicating which access networks of the first subgroup are available for a particular user equipment.

25. The user equipment according to claim 21, wherein the user equipment is configured to generate the selection priority information on the basis of an access network of the first subgroup which is used by a particular user equipment when the user equipment changes to an access network of the second subgroup.

26. The user equipment according to claim 21, wherein the user equipment is configured to generate the selection priority information on the basis of those access networks of the first subgroup which are available for a particular user equipment when the user equipment changes to an access network of the second subgroup.

27. The user equipment according to claim 21, wherein the user equipment is configured to generate the selection priority information on the basis of contextual parameters which are valid for a particular user equipment when the user equipment changes to an access network of the second subgroup, the contextual parameters being selected from the group comprising: an information on active applications of the user equipment, an information on the location of the user equipment, an information on the velocity of the user equipment, an information on the time of day, an information on the day of the week, and an information on a Public Land Mobile Network the user equipment is currently registered at.

28. The user equipment of claim 21, wherein the first access selection function is a 3$^{rd}$ Generation Partnership Projection (3GPP) access selection function, and wherein the second access selection function is an Access Network Discovery and Selection Function (ANDSF).

29. The user equipment of claim 21, wherein the selection priority information indicates said priority order by indicating an access network selected by the first access selection function as having the highest priority among those access networks in the first subgroup that are currently available.

30. The user equipment of claim 21, wherein the selection priority information indicates said priority order as a list of access networks in the first subgroup ordered according to the priority with which the first access selection function is configured to select them.

31. A network system for use in a multi-access network environment with a plurality of access networks, the plurality of access networks comprising a first subgroup of access networks and a second subgroup of access networks which are not part of the first subgroup of access networks,
wherein the network system comprises at least one network component which implements at least a portion of a first access selection function, and a user equipment, a further network component, or both which implement at least a portion of a second access selection function,
wherein the first access selection function is configured to select an access network from the first subgroup on the basis of a first set of selection rules and the second access selection function is configured to select at least one access network from both the first subgroup and the second subgroup on the basis of a second set of selection rules, and
wherein the network system is configured to make a selection priority information of the first access selection function available to the second access selection function, wherein the selection priority information indicates a priority order with which the first access selection function selects access networks in the first subgroup.

32. The network system according to claim 31,
wherein the user equipment, the further network component, or both is configured to implement at least a portion of the second access selection function in such a way that an access network from the first subgroup is only selected if no other access network of the first subgroup having a higher priority according to the first set of selection rules is available.

33. The network system according to claim 31,
wherein the selection priority information specifies an access network of the first subgroup which is selected according to the first access selection function, and
wherein in the second access selection function those access networks of the first subgroup which according to the first set of selection rules have a lower priority than the selected access network are filtered out from the access networks from which the second access selection function selects on the basis of the second set of selection rules.

34. The network system according to claim 31, wherein the network system is configured to maintain an availability information indicating which access networks of the first subgroup are available for a particular user equipment.

35. The network system according to claim 31, wherein the network system is configured to generate the selection priority information on the basis of an access network of the first subgroup which is used by a particular user equipment when the user equipment changes to an access network of the second subgroup.

36. The network system according to claim 31, wherein the network system is configured to generate the selection priority information on the basis of those access networks of the first subgroup which are available for a particular user equipment when the user equipment changes to an access network of the second subgroup.

37. The network system according to claim 31, wherein the network system is configured to generate the selection priority information on the basis of contextual parameters which are valid for a particular user equipment when the user equipment changes to an access network of the second subgroup, the contextual parameters being selected from the group comprising: an information on active applications of the user equipment, an information on the location of the user equipment, an information on the velocity of the user equipment, an information on the time of day, an information on the day of the week, and an information on a Public Land Mobile Network the user equipment is currently registered at.

38. The network system of claim 31, wherein the first access selection function is a 3$^{rd}$ Generation Partnership Projection (3GPP) access selection function, and wherein the second access selection function is an Access Network Discovery and Selection Function (ANDSF).

39. The network system of claim 31, wherein the selection priority information indicates said priority order by indicating an access network selected by the first access selection function as having the highest priority among those access networks in the first subgroup that are currently available.

40. The network system of claim 31, wherein the selection priority information indicates said priority order as a list of access networks in the first subgroup ordered according to the priority with which the first access selection function is configured to select them.

41. A computer program product stored on a non-transitory computer readable medium and comprising program code that when executed on a computer system controls access network selection in a multi-access network environment with a plurality of access networks, the plurality of access networks comprising a first subgroup of access networks and a second subgroup of access networks which are not part of the first subgroup of access networks,
wherein at least a first access selection function and a second access selection function are provided, the first access selection function being configured to select an access network from the first subgroup on the basis of a first set of selection rules and the second access selection function being configured to select at least one access network from both the first subgroup and the second subgroup on the basis of a second set of selection rules,
wherein the program code controls access network selection by making a selection priority information of the first access selection function available to the second access selection function, wherein the selection priority information indicates a priority order with which the first access selection function selects access networks in the first subgroup.

42. The computer program product of claim 41, wherein the first access selection function is a 3$^{rd}$ Generation Partnership Projection (3GPP) access selection function, and wherein the second access selection function is an Access Network Discovery and Selection Function (ANDSF).

* * * * *